W. H. KARICOFE
Corn-Planter.
No. 55,668.
Patented June 19, 1866.
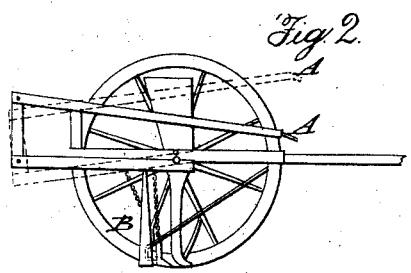
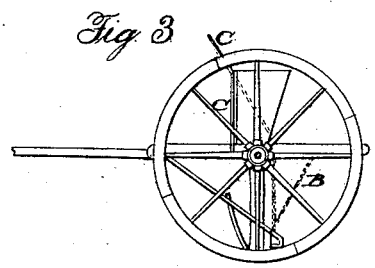
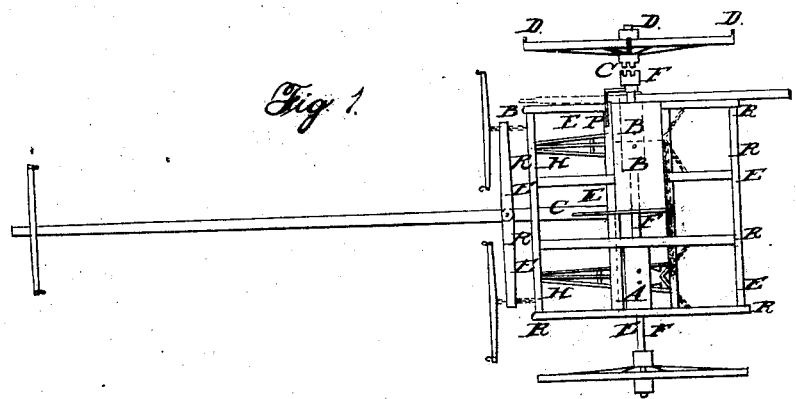
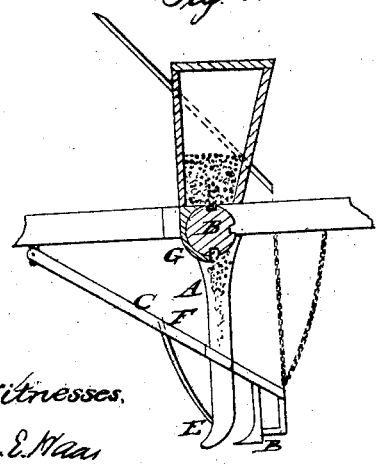
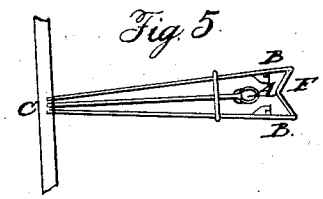
Witnesses.
Inventor.

UNITED STATES PATENT OFFICE.

WILLIAM H. KARICOFE, OF HARRISONBURG, VIRGINIA.

IMPROVEMENT IN CORN-PLANTERS.

Specification forming part of Letters Patent No. 55,668, dated June 19, 1866.

*To all whom it may concern:*

Be it known that I, WILLIAM H. KARICOFE, of the county of Rockingham, in the State of Virginia, have invented a new and useful Machine for Planting Corn and Dropping Ashes, Plaster, Guano, and other Similar Fertilizers; and I do hereby declare that the following is a full, clear, and exact description of the construction and operation of the same, reference being had to the annexed drawings, and to the letters of reference marked thereon.

The nature of my invention consists in providing a machine which, when drawn by two horses, will make two furrows or more in the ground, and deposit therein, at regular intervals of three feet and one-half, a certain number of grains of corn and ashes, plaster, or other similar fertilizer, and cover the same, removing therefrom clods and small stones, and making at each hill of corn a cross-mark, which gives the field the appearance of having been laid off both ways, the regularity of all which enables the land to be plowed both ways. Only one person is needed to manage and drive the machine.

To enable others skilled in the art to make and use my invention, I will proceed to describe its construction and operation.

I construct a frame, of wood or any other material, as represented in Fig. 1 by the letters E E E, consisting of four parallels firmly fastened at the ends R R R R R R to cross-beams of the same material. I attach this frame at F F to a revolving axle. I firmly attach to the revolving axle two cylinders, A and B B, (dotted.) I sink into each of these cylinders eight cups—four for corn and four for the fertilizers—and insert in the bottoms of the cups broad-head screws, which can be elevated or lowered, so as to increase or lessen the quantity of corn or ashes to be received into them.

I make hoppers or funnels, as may be seen in Fig. 4, containing two chambers—one for corn and the other for the fertilizer—which I fit down over the cylinders, as seen in Fig. 4 at B. In front of the cylinders, at B in Fig. 4, I attach a concave to the frame, between which concave and cylinder the cups pass with their contents on their way to the tube A in Fig. 4.

Immediately beneath the cylinders I attach two tubes, of gutta-percha or other material, to the concave and frame, so as to receive readily the contents of the several cups. These tubes I insert in a hollow iron, which is extended into a shovel-plow. I support this shovel by an iron bar, which is connected to the main frame at H in Fig. 1, through which the hollow shovel passes, as will more plainly appear at the letter M in Fig. 5. These shovels are intended to open furrows to receive the deposits.

On each side of these shovels I extend iron bars from H in Fig. 1, to which are attached the covering-shovels, as seen in Fig. 5 at B B, and to the end of the bars to which these covering-shovels are attached I also attach a cube of iron, which, following close after the shovels, removes the clods and small stones that may lie on the hills of corn.

At K K in Fig. 1 I attach a chain or circular iron bar to the shovel-bars, which is fastened to a lever at G, which extends in front of the driver, who, with his foot, can elevate or depress the shovels at will, so as to avoid stumps or rocks in the track.

At E in Fig. 4 I attach a small iron bar to the front shovel and extend it up and through the supporting-bar at F, where it is fastened by a wooden peg, so that when the shovel strikes an obstacle the wooden peg will break and the shovel will then give way. I attach similar bars for a similar purpose to the rear shovels.

Fig. 2 represents a lever used to raise the right-hand wheel from the ground, so as to properly adjust the markers on the wheel. I attach to the shaft the lever A, formed of three pieces working in loose joints near the shaft. I attach to the lever a swinging jack, B, by a hinge. By elevating the lever the swinging jack hangs perpendicular to the lever; then, depressing it, the jack strikes the earth, and the wheel is raised clear of the ground and may be adjusted.

I attach to the right wheel at D D D D, equidistant from each other, four markers (see Fig. 1) or cross-bars of metal. The wheel has a flange at the tire, and these bars are attached with screws. The wheel being about fourteen feet in circumference, the cross-bars will indent or mark the earth at distances of three feet and a half. They are intended to indent at right angles to the furrow and at each hill of corn.

To the right wheel, at C F in Fig. 1, I attach a driver sliding on a key firmly attached to the axle, which is moved by the lever P. This device is intended to throw the machine in and out of gear.

What I claim as my invention, and desire to secure by Letters Patent, is—

The combination of the several parts above described in the construction of a machine that will furrow two rows and drop therein, at regular intervals, corn and ashes, or similar fertilizer; will cover the same, removing clods and small stones; that, by means of the adjustable screws in the cups, the amount of corn, or of the fertilizer, may be fixed by the operator; that, by means of the cross-bars on the right wheel, the land will have the appearance of being checked, and, by means of the driver, the machine may be thrown out of gear and removed to any part of the field without the shaft turning.

WM. H. KARICOFE.

Attest:
F. A. DAINGERFIELD,
CHA. E. HAAS.